United States Patent [19]

Hicks

[11] Patent Number: 4,976,072
[45] Date of Patent: Dec. 11, 1990

[54] FLUID DIRECTING METHOD AND APPARATUS FOR AIDING THE SHAPING, POLISHING AND SMOOTHING OF WORK PIECE BY SANDING

[76] Inventor: Thomas W. Hicks, P.O. Box 9840, South Lake Tahoe, Calif. 95731

[21] Appl. No.: 321,888

[22] Filed: Mar. 10, 1989

[51] Int. Cl.$^5$ .......................................... B24B 55/00
[52] U.S. Cl. ...................................... 51/266; 51/317; 239/282
[58] Field of Search ............ 239/282, 279; 51/281 R, 51/317, 318, 322, 323, 266, 267, 275

[56] References Cited

U.S. PATENT DOCUMENTS

| | | | |
|---|---|---|---|
| 1,876,389 | 9/1932 | Bird | 239/282 |
| 1,962,793 | 6/1934 | Vogel | 239/282 |
| 3,603,510 | 10/1969 | Wagner | 239/282 |
| 4,016,855 | 4/1977 | Mimata | 51/267 |
| 4,193,228 | 3/1980 | Bowber | 51/267 |
| 4,562,963 | 1/1986 | Butler | 239/273 |
| 4,782,591 | 11/1988 | De Vito | 51/267 |
| 4,811,526 | 3/1989 | Roestenberg | 51/266 |

FOREIGN PATENT DOCUMENTS

| | | | |
|---|---|---|---|
| 1345106 | 10/1962 | France | 239/273 |
| 707524 | 5/1952 | United Kingdom | 239/273 |

Primary Examiner—Frederick R. Schmidt
Assistant Examiner—Blynn Shideler
Attorney, Agent, or Firm—Harold D. Messner

[57] ABSTRACT

A fluid directing means is described that can be used with a conventional garden hose or connected directly to a water tap for applying a linear array of water across a work piece such as an automobile, undergoing repair. The linear array of water consisting essentially of side-by-side streams of water emitted from a flexible hose closed at a far wall and having a series of openings along a segment of its side wall. Because of the size, shape and orientation of the openings, there is sufficient volume of water to facilitate the shaping, smoothing and polishing of the damaged area without undue waste. In addition, a series of non-marring suction cups are provided. The cups are oriented so that the working edge of each cup define a suction plane normal to the axis of symmetry of each opening. In one arrangement, the array of openings directs the streams of water from an essentially common height above the earth's surface at a maximum impact angle (90 degrees). In another arrangement, the array is sinusoidally positioned so that there is an increase in the volume of water per unit length without need to vary the volume entering the hose. Also since the cups are attached by suction alone, they can be easily re-arranged as required.

15 Claims, 4 Drawing Sheets

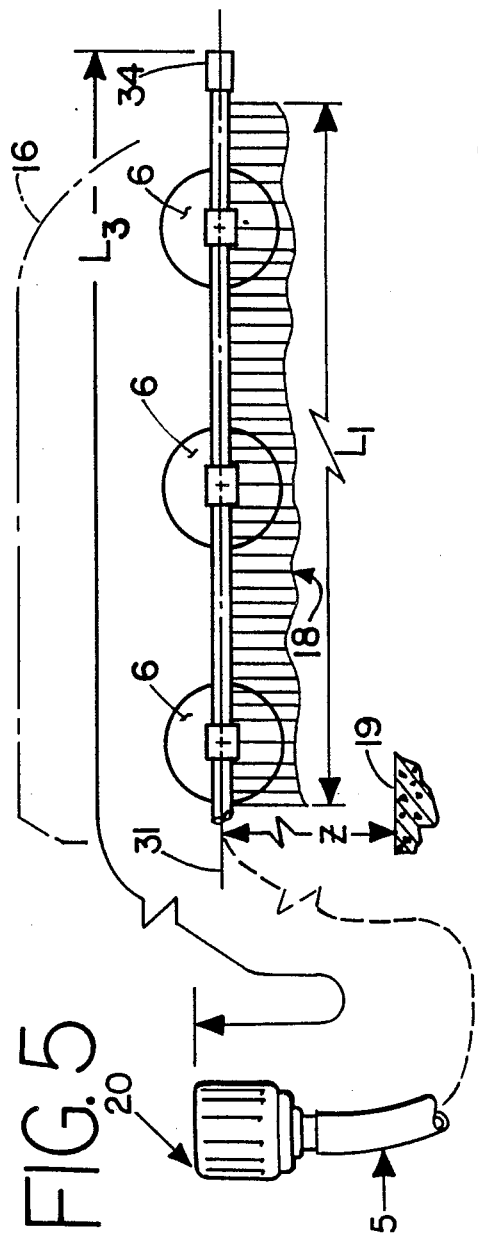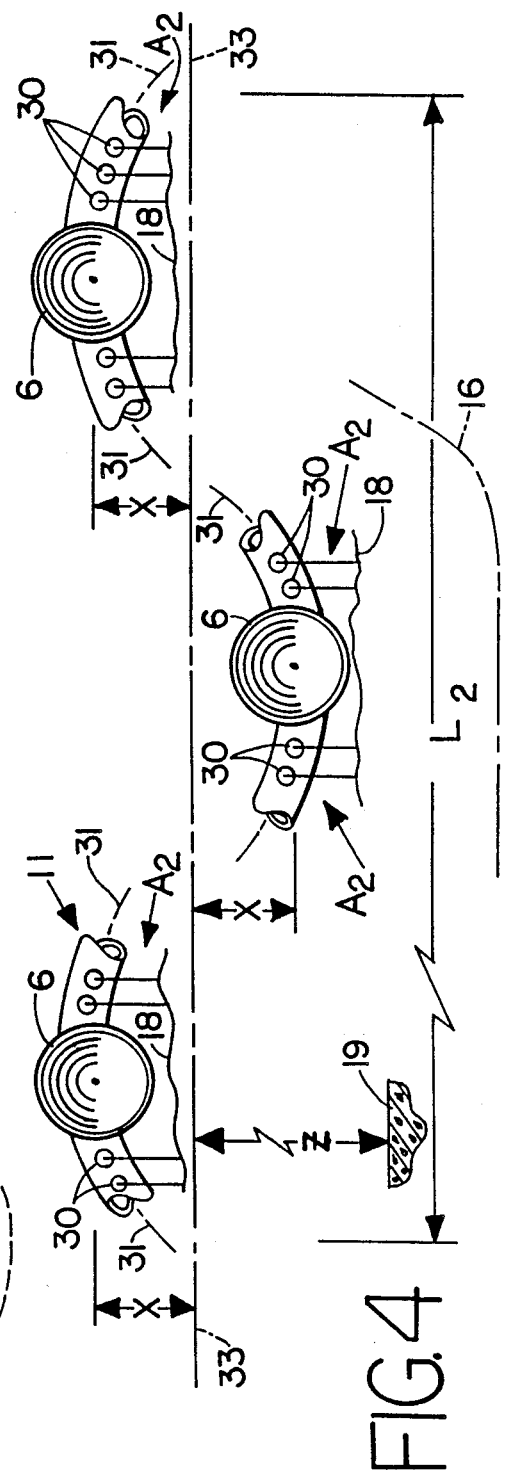

FLUID DIRECTING METHOD AND APPARATUS FOR AIDING THE SHAPING, POLISHING AND SMOOTHING OF WORK PIECE BY SANDING

FIELD OF THE INVENTION

This invention relates to the shaping, polishing and smoothing by sanding in which a wetting fluid is directed upon a work piece as an abrasive tool such as sandpaper, is brought into working contact with the piece by a human operator. In one aspect, a fluid dispensing means is used to direct the wetting fluid using a series of aligned openings over a segment of a closed-end hose to provide a series of adjacent, closely-spaced streams of fluid across the work piece. In another aspect, the hose is fitted with a series of suction cups to disconnectably attach the hose in flexible but effective relationship with respect to the work piece.

DEFINITIONS

"Sanding" is a process of smoothing, polishing and-/or shaping a work piece using an abrasive tool such as sandpaper in the presence of a wetting fluid.

"Wetting Fluid" is preferably water and is continuously applied to the surface of the work piece. It decreases the coefficient of friction between the worked surface of the work piece and the abrasive tool as well as carries away dislodged "Work Piece" is usually two-dimensional such as the surface of a side, fender or the like of a vehicle.

"Work Place" can be any location where the work is performed including a closed shelter or out in the open remote for the fixed source of fluid.

BACKGROUND OF THE INVENTION

In the repair, shaping, smoothing and polishing of damaged surfaces of vehicles in a conventional work place, water can be used as a friction reducer and particle remover. The water is applied to the area as the surface is worked by a human operator. If the source of the water is either from a bucket or from a conventional garden hose, then the operator must periodically interrupt his actual working of the work piece to apply water. Depending upon the orientation of the damaged area (vertical, horizontal or combination), the number of interruptions per unit time can represent a large increment of the total time involved to repair the vehicle. In addition, large amounts of excess water can accumulate on the floor of the work place. Such accumulation not only represents a safety hazard, it is also a waste of a valuable natural resource.

While heretofore there have been various arrangements in the art to carry wetting fluids to the work piece, I am unaware of any fluid directing method and apparatus which be flexibly arranged in non-marring contact with the damaged area to be worked irrespective of orientation of the word piece to provide a linear array of wetting fluid across the work piece that facilitates rapid working by a human operator working alone.

SUMMARY OF THE INVENTION

A fluid directing means is described that can be used with a conventional garden hose or connected directly to a water tap for applying a linear array of water (consisting essentially of side-by-side streams) across a work piece undergoing repair. It consists of a flexible hose of cylindrical form closed by a far end wall and having a series of openings along a segment of its side wall through which the wetting fluid is dispensed. Because of the size, shape and orientation of the openings, a linear source array of wetting fluid is formed for dispensing the fluid as a series of side-by-side streams across the work piece in sufficient volume to facilitate the shaping, smoothing and polishing of the damaged area but not does not commit undue waste of the fluid. In addition, a series of non-marring suction cups are provided along the hose. The cups are oriented with respect to the hose so that the working edge of each cup define a suction plane normal to the axis of symmetry of each opening. In addition, the end of the openings are offset a common distance d from the surface of the work piece since the offset distance from the center of the misting segment to the suction planes are constant along the hose. Hence, once the cups are attached to the work piece, the array of openings directs the wetting fluid in a series of streams that impact the surface of the piece at a maximum impact angle (90 degrees) but without undue aeration of the wetting fluid. Also since the cups are attached by suction alone, they can be easily re-arranged as required.

In one arrangement, with an array length of about four feet, the cups and hose are arranged so that the arrangement can be placed upon a vertical surface of the work piece at a common height above the earth's surface. In another arrangement, the array is sinusoidally positioned about an axis that can also be of common height above such surface so that there is an increase in the volume of wetting fluid per unit length without need to vary the volume of wetting fluid entering the near end of the hose.

DESCRIPTION OF THE FIGURES

FIG. 4 is an enlarged view of the fluid dispensing means of FIG. 1;

FIG. 5 is another enlarged view of the fluid dispensing means of FIG. 4 re-arranged is sinusoidal manner to increase wetting volume per unit length of hose;

DESCRIPTION OF AN EMBODIMENT OF THE INVENTION

Figure 1:
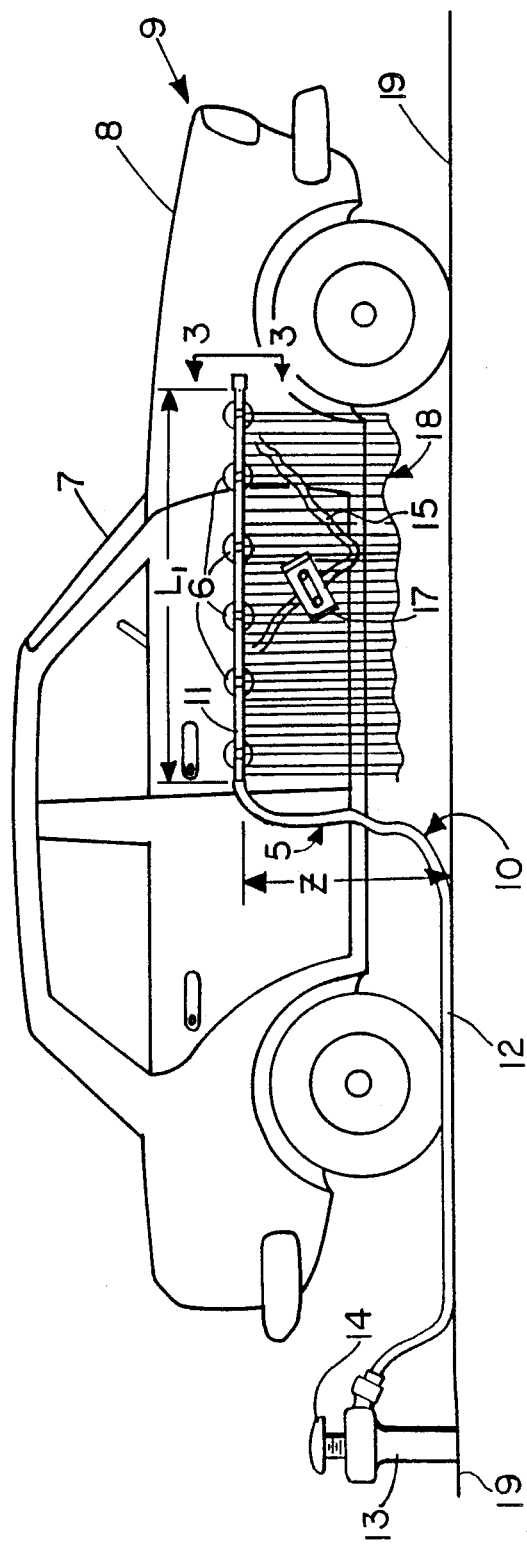
FIG. 1 is a side view of a motor vehicle with the fluid dispensing means of the present invention comprising a flexible hose segmented into a linear sourcing segment and a transition segment in which the sourcing segment is attached by suction cups so as to provide, inter alia, an array source of wetting fluid to the surface to be worked in conjunction with a working abrasive tool.

FIG. 1 illustrates fluid dispensing means 5 of the present invention releasably attached by suction cups 6 to the side door 7 and front fender 8 of motor vehicle 9, and includes a flexible hose 10 forming a linear sourcing segment 11 (equipped with the suction cups 6) and a transition segment 12 connected between the segment 11 and a source of wetting fluid, say conventional water faucet 13. Assume that the side door 7 has been damaged in which a crease 15 extends over a large extent or area of the door 12 and fender 13. To repair the crease 15 will require sequentially working the crease 15 with a conventional abrasive tool 17 at different locations along the vehicle 9. In that way, a human operator (not shown) can smooth, shape and polish the crease 15 say, after a filling material (also not shown) has been applied to the latter.

In accordance with the present invention, such shaping, smoothing and polishing is achieved by causing movement of the tool 17 in different directions across the crease 15 aided by the presence of a linear array of wetting fluid continuously emitted from the linear sourcing segment 11 of the flexible hose 10. Generally, the longitudinal extend L1 of the linear array of wetting fluid generally indicated at 18, is directly related to two factors: (i) the length of the linear sourcing segment 11, and (ii) the oriention of the latter across the area to be worked. The segment 11 is usually positioned atop the crease 15 relative to the earth's surface 19. In that way, the wetting fluid within the linear array 18 (side-by-side continuous steams of the wetting fluid) cascades by gravity over the crease 15 toward the earth's surface 19, as the operator propels in the working tool 17 in a variety of working movements.

As previously mentioned, the transition segment 12 of the hose 10 connects the linear sourcing segment 11 with the source of the wetting fluid, namely conventional faucet 13. Since both the linear sourcing and transition segments 11 and 12 are of smaller diameter than a conventional garden hose, a combination coupler-reducer 20 is used to connect the transition segment 12 to the faucet 13. Since the faucet 13 is provided with a valve 14, there is sufficient fluid pressure to permit the operator to adjust the linear array of fluid 18 to his specifications, as needed.

Figure 2:
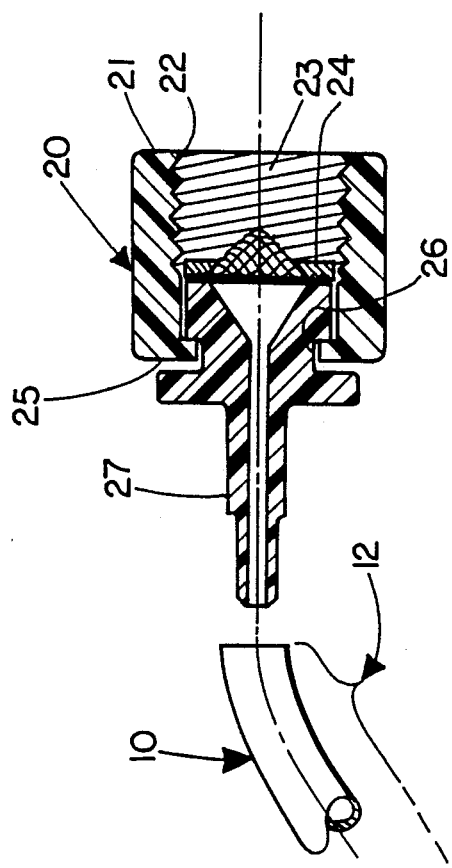
FIG. 2 is partial sectional view of a reducer-coupler for coupling the hose of FIG. 1 to a conventional plumbing faucet.

FIG. 2 illustrates coupler-reducer 20 in more detail.

As shown, coupler-reducer 20 includes a rotating member 21 having interior threads 22 forming an interior cavity 23 that connects to the faucet 13 (FIG. 1) through a washer-screen member 24. The rotating member 21 has an end wall 25 that forms a partial closure of the interior cavity 23 having a central aperture 26 though which a non-rotatable male coupler 27 extends. The male coupler 27 includes an outer shell 28 for connection to the transition segment 12 of the hose 10 as well as includes a central cavity region 29 that is in fluid contact with the interior cavity 23 of the rotating member 21. The outer shell 28 is increased in diameter adjacent to the end wall 25 to form a stop for limiting longitudinal movement between the rotating member 21 and the non-rotating male coupler 27.

Figure 6:
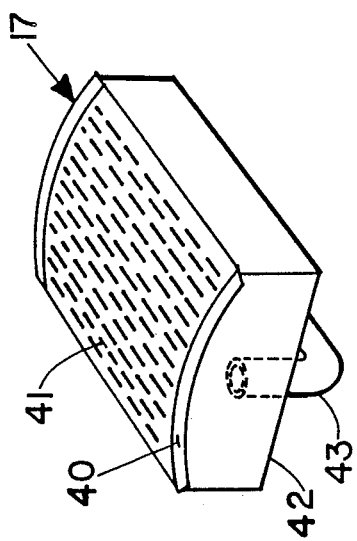
FIG. 6 is a perspective view of a abrasive tool for shaping and smoothing the surface of the work piece of FIG. 1.
Figure 3:
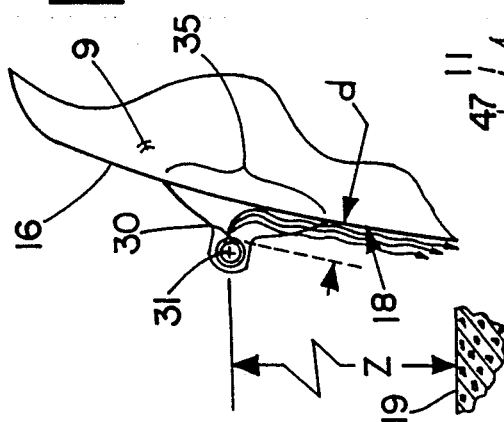
FIG.3 is an end view of the fluid dispensing means of FIG. 1 taken along segment 3—3 illustrating the operations of the latter.

Size, shape and orientation of the linear array of wetting fluid 18 relative to the crease 15 is also a function of how the segment 11 of the hose 10 is placed both relative to the earth's surface 19 and to working surface 16 of the vehicle 9. As shown in FIG. 3, the linear sourcing segment 11 of the hose 10 is placed above the earth's surface 19, and note further that radially directed openings 30 and the axis of symmetry 31 of the segment 11 define a emission plane for the wetting fluid that is normal to the surface 16 of the vehicle 9 to be worked. In addition, an offset distance d is also defined between the ends of the openings 30 (at surface 45 of the segment 11) and the suction plane 35 of the cups 6 and the surface 16 of the vehicle 9. Such offset distance d is substantially the same along the segment 11 so that after the latter is attached to the vehicle 9, a liner source array for the wetting fluid is established along the segment 11. Also the segment 11 is also seen to be vertically positioned a common height Z above the earth's surface 19. Thus the shape of the linear array of wetting fluid 18 over a selected area of surface 16 can be made to vary from a minimum (assuming constant flow of wetting fluid) as shown in FIGS. 1, 3 and 5 to a greater density when the segment 11 is positioned as shown in FIG. 4 when the openings 30 are placed in sinusoidal or angled pattern relative to the earth's surface 19. However, due to the positioning of openings 30 the offset distance d, there is little direct spray away from the surface 16 and hence, wetting of the operator as he works the surface 16 of the vehicle 9.

In more detail in FIGS. 4 and 5, nóte in both embodiments that the suction cups 6 are oriented such each of the series of openings 30 directs the wetting fluid in a small diametered stream 32 that impacts the surface 16 at a maximum impact angle, (about 90 degrees) to better cause formation of streams of the wetting fluid and the formation of the correctly dense side-by-side array streams 18. Hence in effect, a linear array is created since the effect of the continuous series of openings 30 is similar to a single source of similar characteristics. Additionally, the operator can be assured of further flexibility in that he can regulate flow so that there is a correct amount of wetting fluid over the longitudinal extent L1 to permit best lubrication and working of surface 16 yet does not commit undue waste of the wetting fluid. The wetting fluid is caused to exit ("forced") through the radial openings 30 by the fact that the end of the segment 11 is closed to fluid flow by a closure member 34.

Note also in FIGS. 4 and 5 that the longitudinal extent L1 or L2 of the area A1 or A2 associated with the segment 11 (and the resulting linear array of wetting fluid 18) is also a function of the orientation of the latter segment 11 (by the rearrangement of suction cups 6) relative to the earth's surface 19. In FIG. 5, the working extent L1 is seen to be longer inasmuch as the common height Z of the segment 11 is constant and coincident with the common axis of symmetry 31 of the segment 11. Thus the axis 30 is parallel to the earth's surface 19. In FIG. 4, however, the longitudinal extent L2 associated with segment 11 has been shorten by the placing of the openings 31 in sinusoidal pattern or angled relative to central axis of formation 33 so that $L1>L2$ but $L3>L1>L2$. In that way, the height Z changes from a maximum of $Z+x$ to a minimum of $Z-x$. Hence by reducing the longitudinal extent as shown in FIG. 4, the amount of wetting fluid within area A2 can be significantly increased, if needed. Likewise, by stretching the longitudinal extent to its maximum, i.e. longitudinal extent is equal to L1 in FIG. 5, the amount of fluid within area A1 is held at a maximum for the system of the present invention. Usually, L3 is about 35 feet and L1 is about 4 feet, while L2 varies from 2 to 3 feet.

FIG. 6 shows the abrasive working tool 17 in more detail.

As shown, the tool 17 includes a working surface 40 to which an abrasive means such as sandpaper 41 is attached, and an opposed surface 42 to which handle 43 extends. The latter permits the operator to manipulate the tool to shape, smooth and polish in the presence of the mist 18 of wetting fluid as described above and below.

Figure 8:
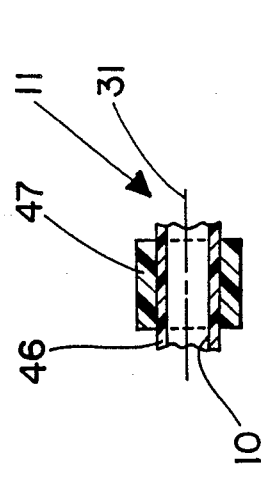
FIG. 8 is a section taken along line 8—8 of FIG. 7.
Figure 7:
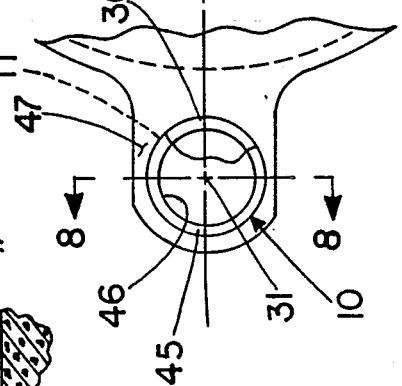
FIG. 7 is an enlarged side view of a suction cup attached to the linear sourcing segment of the flexible hose of the fluid dispensing means of FIG. 1.

FIGS. 7 and 8 illustrate the mounting relationship between the suction cups 6 and the linear sourcing segment 11 of the flexible hose 10. As shown, outer surface 45 of segment 11 is permanently mounted within recess 46 of support block 47 of cup 6. Such mounting is repeated at periodic locations along the segment 11. Working edge 48 of each cup 6 define a suction plane that is normal to an axis of formation 49 that is seen to be passing through both the opening 30 and the axis of symmetry 31 of the segment 11. Interior surface 50 of each cup 6 defines a center of formation at 51 to permit air within the cavity 52 to be forced therefrom and a suction force generated. A release tab 53 at the exterior surface 54 of each cup 6 adjacent to the suction at working edge 48, permits easy release of the suction pressure within the cavity 52.

Figure 9:
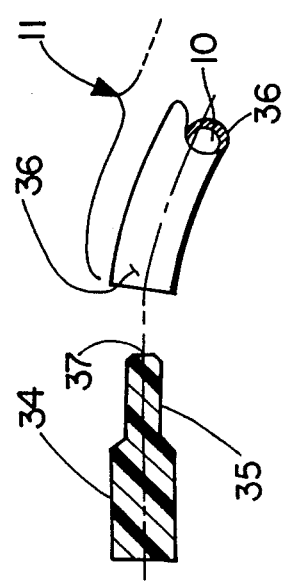
FIG. 9 is an enlarged sectional view of closure member at the end of the linear sourcing segment of the fluid dispensing means of FIG. 5.

FIG. 9 illustrates in more detail, closure member 34 used for closing off the end of the linear sourcing segment 11 of the hose 10. As shown, the member 34 is cylindrically shaped, having reduced portion 35 for fitting to the interior 36 of the segment 11 but has a solid end wall 37 to prevent escape of the wetting fluid through end 38 of the segment.

METHOD ASPECTS

The present invention has special application in the shaping, smoothing and polishing of the exterior surface or surfaces of motor vehicles by sanding. Such sanding is carried out in the presence of a linear array of wetting fluid applied to the vehicle by means of the fluid dispensing means 5 FIGS. 1 and 5 that includes a linear sourcing segment 11 releasibly attached to the vehicle by suction cups 6. In that way, a human operator working alone, say using an abrasive tool, can quickly and easily perform the sanding function as he re-arranges the sourcing segment 11 as the work progresses. Additionally, since the segment 11 and cups 6 are formed of pliant material such as plastic or rubber, accidental marring of undamaged areas is minimized.

Having described a method and apparatus in accordance with the present invention in which its advantages can be appreciated by those skilled in the art, it also evident that certain variations are also suggested. It is therefore my intent that such variations be within the scope of the present invention as set forth in the following claims.

What is claimed is:

1. Fluid dispensing means for generating and applying a linear array of wetting fluid to the surface of a work piece to be sanded, comprising a flexible cylindrical hose segmented into a linear sourcing segment, a series of suction cups directly and independently attached along said linear sourcing segment capable of non-marring pressure attachment to said work piece at a plurality of suction closure planes, a series of radial openings in said sourcing segment intermediate of said suction cups and positioned such that said sourcing segment is offset from said work piece by a distance d after said pressure attachment occurs so that a linear array of wetting fluid can be directed toward said plurality of suction closure planes to effectively aid wet sanding of said work piece without undue waste of said wetting fluid.

2. Fluid dispensing means of claim 1 in which said hose includes a transition segment having a coupler for coupling said hose to a conventional plumbing faucet.

3. Fluid dispensing means of claim 2 in which said linear sourcing segment includes a closure member for preventing flow of wetting fluid from said hose in a stream parallel to the axis of symmetry thereof.

4. Fluid dispensing means of claim 1 in which said hose and suction cups are formed of pliant, non-marring materials that provide said non-marring pressure attachment between said work piece and said suction cups.

5. Fluid dispensing means of claim 1 in which said openings formed in a side wall of said linear sourcing segment and after pressure attachment occurs between said suction cups and said work piece, are directed toward said plurality of suction closure planes at similar relatively high radial angles each measured with respect to each axis of symmetry and a substantially vertical plane, whereby said resulting array of wetting fluid can be directed toward said work piece to efficiently aid wet sanding thereof.

6. Fluid dispensing means of claim 5 in which said suction cups are permanently attached to said linear sourcing segment intermediate said radial opening such that said resulting array of wetting fluid defines an emission plane through said openings that is essentially normal to the working surface of said work piece.

7. Method for generating and applying a linear array of wetting fluid to the surface of a work piece to be sanded, such as the surface of a vehicle, using a flexible cylindrical hose segmented into to least a linear sourcing segment, a series of suction cups directly and independently attached along said sourcing segment of said hose, and a series of radial openings in said sourcing segment intermediate of said suction cups, comprising the steps of:
   (a) non-permanently attaching said linear sourcing segment to said surface of said work piece in a non-marring pressure contact, by creating a plurality of suction closure planes between said suction cups and said surface of said work piece whereby said sourcing segment is offset from said work piece a distance d,
   (b) controllably applying wetting fluid to said surface of said work piece through said series of openings to generate a linear array of wetting fluid that is directed toward said plurality of suction closure planes and impacts siad work piece at one one or more impact angles,
   (c) abrasively working an abrasive tool in the presence of said linear array of wetting fluid to efficiently shape, smooth and/or polish said surface of said work piece without undue waste of wetting fluid.

8. Method of claim 7 with additional step of detaching and then re-attaching said linear sourcing segment relative to said surface of said work piece to allow progressive working of said surface of said work piece.

9. Method of claim 7 in which step (a) is further characterized by said offset distance d being measured between the ends of said openings and the suction closure planes of said suction cups.

10. Method of claim 7 in which step (a) is further characterized by the placement of said linear sourcing segment in a straight line arrangement upon said surface of said work piece whereby said wetting fluid array of step (b) is directed in a straight line array toward said suction closure planes.

11. Method of claim 7 in which in which step (a) is further characterized by the placement of said linear sourcing segment in an angled line arrangement upon said surface of said work piece whereby said wetting fluid array of step (b) is directed in an angled line array toward said suction closure planes.

12. Method of claim 7 in which step (a) is further characterized by the placement of said linear sourcing segment in a sinusoidal line arrangement upon surface of said work piece whereby said wetting fluid array of step (b) is directed in a sinusoidal line array toward said suction closure planes.

13. Method of claim 7 in which said offset distance d of step (a) is substantially equal to that between ends of said openings and said suction closure planes of said cups.

14. Method of claim 7 in which said one or more impact angles relative to the axes of symmetry of said openings and a vertical plane, is relatively large so as to efficiently aid wet sanding of said work piece.

15. Method of claim 14 in which said one or more impact angles is essentially ninety degres so as to efficiently aid wet sanding of said work piece.

* * * * *